United States Patent

Seto et al.

[11] Patent Number: 5,201,922
[45] Date of Patent: Apr. 13, 1993

[54] DISPERSE DYE MIXTURE AND DYEING METHOD EMPLOYING IT: ORANGE AND YELLOW AZO DISPERSE DYE MIXTURE FOR POLYESTER FIBERS

[75] Inventors: Kouichi Seto; Riyouichi Sekioka, both of Kitakyushu, Japan

[73] Assignee: Hoechst Mitsubishi Kasei Co., Ltd., Tokyo, Japan

[21] Appl. No.: 805,676

[22] Filed: Dec. 12, 1991

[30] Foreign Application Priority Data

Dec. 18, 1990 [JP] Japan .................. 2-403391

[51] Int. Cl.$^5$ .......................... C09B 67/22; D06P 1/18
[52] U.S. Cl. ............................ 8/639; 8/636; 8/693; 8/922
[58] Field of Search ...................... 8/639, 693

[56] References Cited

U.S. PATENT DOCUMENTS 4,916,769  4/1990  Brierly et al. ............... 8/639
4,917,769  4/1990  Brierly et al. ............... 8/639

FOREIGN PATENT DOCUMENTS 85823  8/1983  European Pat. Off. .
68-004212  2/1968  Japan .

*Primary Examiner*—A. Lionel Clingman
*Attorney, Agent, or Firm*—Oblon, Spivak, McClelland, Maier & Neustadt

[57] ABSTRACT

A disperse dye mixture comprising from 20 to 80% by weight of an orange disperse dye of the following formula (A) and from 20 to 80% by weight of an orange disperse dye of the following formula (B), as dye components:

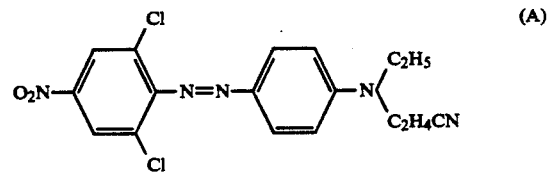

(A)

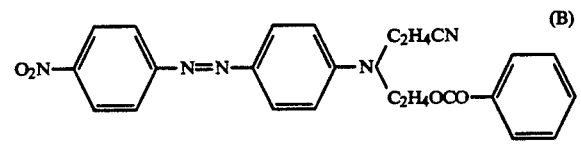

(B)

10 Claims, No Drawings

DISPERSE DYE MIXTURE AND DYEING METHOD EMPLOYING IT: ORANGE AND YELLOW AZO DISPERSE DYE MIXTURE FOR POLYESTER FIBERS

The present invention relates to a disperse dye mixture. More particularly, it relates to an orange disperse dye mixture which is excellent in the dyeing affinity by carrier dyeing and which is also excellent in the temperature dependency and the high temperature dispersibility during high temperature dyeing.

Heretofore, C. I. Disp. φ-29 and C. I. Disp. φ-30 have been known as orange dyes excellent in the high temperature dyeing properties, but they have a problem in the dyeing properties by carrier dyeing in which a carrier is used so that polyester fibers can be dyed at a temperature lower than the temperature for usual dyeing conditions.

On the other hand, the orange disperse dye of the following formula (A):

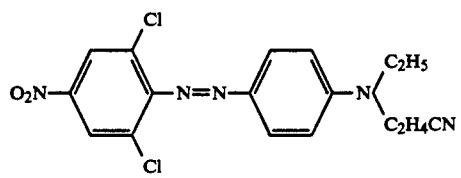

is known as a dye which provides light fastness when polyester fibers are thereby dyed. However, also this disperse dye can not be said to have adequate dyeing affinity by carrier dyeing. Besides, the reddish color hue is so strong that the application range is relatively narrow as an orange dye for the three primary colors for general purpose, and the sublimation fastness is inadequate and the high temperature dispersibility is poor.

It is an object of the present invention to improve the dyeing affinity by carrier dyeing, temperature dependency, high temperature dispersibility and sublimation fastness while maintaining excellent light fastness of the orange disperse dye of the above formula (A).

Under these circumstances, the present inventors have conducted extensive researches and, as a result, have found it possible to improve the dyeing properties remarkably over the case where the dye is used alone, by using the dye of the formula (A) and a dye having a certain specific structure in the form of a mixture.

Namely, the present invention provides a disperse dye mixture comprising from 20 to 80% by weight of an orange disperse dye of the following formula (A) and from 20 to 80% by weight of an orange disperse dye of the following formula (B), as dye components:

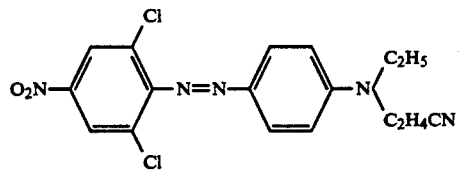

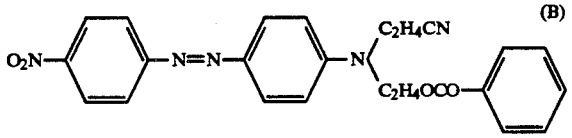

The present invention also provides a method for dyeing polyester fibers with such a disperse dye mixture.

Now, the present invention will be described in detail with reference to the preferred embodiments.

The dyes of the formulas (A) and (B) are per se known from Japanese Examined Patent Publication No. 4212/1968.

In the present invention, the disperse dyes of the formulas (A) and (B) are mixed, and their blend ratio is selected within such a range that the component (A) is from 20 to 80% by weight and the component (B) is from 20 to 80% by weight. A preferred blend ratio of the component (B) to the component (A) is from 0.2 to 2 times by weight, more preferably from 0.3 to 1.5 times by weight. If the amount of the component (B) is too small or too large, the effects for improving the carrier dyeing properties, the temperature dependency, the high temperature dispersibility, etc. will be inadequate, and the color hue will not be close to C. I. Disp. φ-29 or C. I. Disp. φ-30 having excellent high temperature dyeing properties, and there will be a drawback that the applicability will be low.

The disperse dye mixture of the present invention may further contain a yellow disperse dye of the following formula (C):

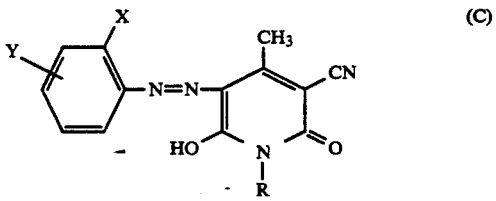

wherein X is a hydrogen atom or a nitro group, Y is a halogen atom, a phenoxyethoxycarbonyl group or a phenylsulfonyloxy group, and R is a $C_{1-8}$ linear or branched alkyl group.

The dye of the formula (C) is per se known from Japanese Examined Patent Publication No. 18549/1972.

The halogen atom for Y in the formula (C) is usually a chlorine atom or a bromine atom. It is preferred that substituent Y is located at the 3- or 4-position to the azo group in the benzene ring. (Substituent X is located at the 2-position.)

The $C_{1-8}$ alkyl group for R may, for example, be methyl, ethyl, n-propyl, i-propyl, n-butyl, t-butyl, n-pentyl, n-hexyl, n-heptyl or n-octyl. Particularly preferred is a $C_{1-4}$ alkyl group.

When the yellow disperse dye of the formula (C) is to be incorporated, the blend ratio is preferably selected within such a range that the dye component (A) is from 20 to 80% by weight, the component (B) is from 20 to 80% by weight and the component (C) is more than 0 and up to 30% by weight. Further, the ratio of the component (C) to the total amount of the components (A) and (B) is preferably not more than 0.5 time by weight, preferably from 0.1 to 0.4 time by weight.

When the dye mixture of the present invention contains the dye of the formula (C), the dye of the formula (C) may be incorporated alone or two or more of them may be used in combination.

The disperse dye mixture of the present invention comprises the above two types of disperse dyes in combination as orange components, and if necessary, the above-mentioned yellow component may also be incorporated. Further, in order to attain a desired color hue, a blue component and a red component may further be incorporated.

The disperse dye of the above formula (A) to be used in the present invention can be readily prepared in accordance with a conventional method, for example, by diazotizing 2,6-dichloro-4-nitroaniline, followed by coupling with N-ethyl-N-cyanoethylaminobenzene. The disperse dye of the above formula (B) can be readily prepared by diazotizing p-nitroaniline, followed by coupling with N-cyanoethyl-N-benzyloxyethylaminobenzene.

The disperse dye of the above formula (C) can be readily be prepared by diazotizing an aniline derivative of the following formula:

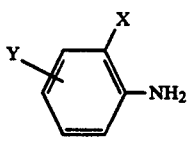

and subjecting the diazotized product to a coupling reaction with a compound of the following formula:

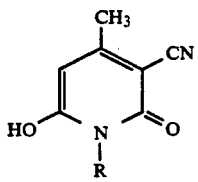

To use the disperse dye mixture of the present invention, the respective dye components are mixed with a conventional anion dispersant such as a naphthalene sulfonic acid-formalin condensation product or a lignin sulfonic acid-formalin condensation product in accordance with a conventional method, and the respective dye cakes are subjected to dispersing treatment, followed by mixing, or the respective dye components are firstly mixed, followed by similar dispersing treatment to prepare a disperse dye composition.

The disperse dye mixture of the present invention may be used primarily for dyeing polyester fibers. The polyester fibers may be employed alone or in combination with other fibers.

Various methods may be employed for dyeing. However, when applied to an exhaustion dyeing method, the present invention provides excellent dyeing affinity and temperature dependency as well as high temperature dispersibility. The exhaustion dyeing may be carrier dyeing wherein a carrier is used, and there is no particular restriction as to the dyeing conditions. However, the dyeing temperature is usually from 95 to 140° C., and the pH of the dyeing bath is at a level of from 4 to 9.5.

The disperse dye mixture of the present invention comprising the orange disperse dye of the formula (A) and the orange disperse dye of the formula (B), has improved dyeing affinity by the carrier dyeing and improved temperature dependency compared with the orange disperse dye of the formula (A) and the orange disperse dye of the formula (B) respectively while maintaining the excellent property of the light-fastness of the orange disperse dye of the formula (A), and it also has high temperature dispersibility. Thus, it is practically very useful.

Further, a disperse dye mixture having a dye of the formula (C) incorporated to the disperse dye mixture comprising the orange disperse dye of the formula (A) and the orange disperse dye of the formula (B), is also excellent in the carrier dyeing property, the temperature dependency, light- and sublimation-fastness, and high temperature dispersibility, and such a disperse dye mixture is also very useful.

Now, the present invention will be described in further detail with reference to Examples. However, it should be understood that the present invention is by no means restricted to such specific Examples.

REFERENCE EXAMPLE

Preparation of the Respective Disperse Dye Compositions (1) 52 g of a disperse dye of the formula (A) was pulverized in a wet system for 5 hours together with 30 g of a lignin sulfonic acid-formalin condensation product, 18 g of a naphthalene sulfonic acid-formalin condensation product and 300 g of water by a sand grinder, followed by spray drying to obtain a powdery dye composition A.

(2) 47 g of the disperse dye of the formula (B) was pulverized in a wet system for 5 hours together with 50 g of a lignin sulfonic acid-formalin condensation product, 3 g of a naphthalene sulfonic acid-formalin condensation product and 300 g of water by a sand grinder, followed by spray drying to obtain a powdery dye composition B.

(3) 54 g of a disperse dye of C-1 in the following Table 1 was pulverized in a wet system for 5 hours together with 34 g of a lignin sulfonic acid-formalin condensation product, 12 g of a cresol-formalin condensation product and 300 g of water by a sand grinder, followed by spray drying to obtain a powdery dye composition C-1.

(4) 47 g of a disperse dye of C-2 in the following Table 1 was pulverized in a wet system for 5 hours together with 27 g of a lignin sulfonic acid-formalin condensation product, 26 g of a naphthalenesulfonic acid-formalin condensation product and 300 g of water by a sand grinder, followed by spray drying to obtain a powdery dye composition C-2.

(5) 39 g of a disperse dye of C-3 in the following Table 1 was pulverized in a wet system for 5 hours together with 35 g of a lignin sulfonic acid-formalin condensation product, 26 g of a cresol-formalin condensation product and 300 g of water by a sand grinder, followed by spray drying to obtain a powdery dye composition C-3.

(6) 54 g of a disperse dye of C-4 in the following Table 1 was pulverized in a wet system for 5 hours together with 34 g of a lignin sulfonic acid-formalin condensation product, 12 g of a cresol-formalin condensation product and 300 g of water by a sand grinder, followed by spray drying to obtain a powdery dye composition C-4.

TABLE 1

[Structure: pyridone azo dye with phenyl group bearing X at position 2 and Y at positions 3-6; pyridone ring has CH3, CN, =O, HO, and N-R substituents]

| No. | X | Y | R |
|---|---|---|---|
| C-1 | $NO_2$ | 4-Cl | $C_8H_{17}$ |
| C-2 | H | 4-$COOC_2H_4O$—(phenyl) | $CH_3$ |
| C-3 | H | 3-$OSO_2$—(phenyl) | $CH_3$ |
| C-4 | $NO_2$ | 4-Cl | $C_2H_5$ |

EXAMPLES 1 TO 9 AND COMPARATIVE EXAMPLES 1 TO 10

The disperse dye compositions A, B and C-1 to C-4 prepared in Reference Example were blended in the proportions as identified in Table 2 to obtain dye mixtures. Using such dye mixtures, dyeing tests were conducted for evaluation, respectively, in accordance with the following methods. The results are shown in Table 2.

DYEING TESTS

(1) High Temperature Dyeing

A polyester spun-cloth was dyed at a dyeing concentration of 1/1N, 2/1N or ¼N at a bath ratio of 1:10 at 135° C. for 30 minutes using a dyeing bath containing 1 g/l of an anion leveling agent and adjusted to pH 5.0±0.5 by acetic acid and sodium acetate. The dyed cloth thereby obtained was subjected to reduction cleaning at 80° C. for 10 minutes by means of 2 g/l of sodium hydroxide, 2 g/l of hydrosulfite and 1 g/l of a special anion-nonion surfactant.

(2) Carrier Dyeing

A polyester spun-cloth was dyed at a dyeing concentration of 2/1N at a bath ratio of 1:10 at 98° C. for 60 minutes using a dyeing bath contaiing 1 g/l of an anion leveling agent and 8% o.w. f. of a diphenyl derivative carrier and adjusted to pH 5.0±0.5 by acetic acid and sodium acetate. The dyed cloth thereby obtained was subjected to reduction cleaning at 80° C. for 10 minutes by means of 2 g/l of sodium hydroxide, 2 g/l of hydrosulfite and 1 g/l of a special anion-nonion surfactant, followed by heat drying treatment at 160° C. for 2 minutes to remove the carrier.

Evaluation Methods

(1) Carrier Dyeing Properties

The surface densities of the respective dyed clothes obtained by the high temperature dyeing and the carrier dyeing at a dyeing concentration of 2/1N, were measured, and the carrier dyeing property was evaluated in accordance with the following formula.

Carrier dyeing property = (The surface density of the dyed cloth by the carrier dyeing/The surface density of the dyed cloth by the high temperature dyeing) × 100 (%)

(2) Temperature Dependency

The surface densities of the cloths dyed at dyeing temperatures of 135° C. and 120° C., respectively, at a dyeing concentration of 2/1N by high temperature dyeing, were measured, and the temperature dependency was evaluated in accordance with the following formula.

Temperature dependency = (Surface density of the cloth dyed at a dyeing temperature of 120° C./Surface density of the cloth dyed at a dyeing temperature of 135°) × 100 (%)

(3) Light Fastness

Using a cloth dyed at a dyeing concentration of ¼N by high temperature dyeing, the evaluation was conducted in accordance with JIS L0842-1971.

(4) Sublimation Fastness

Using a cloth dyed at a dyeing concentration of 1/1N by high temperature dyeing, the evaluation was conducted in accordance with JIS L0879-1968.

(5) High Temperature Filtration Test 200 ml of a dyeing bath containing 1.6 g of a dye and 1 g/l of a leveling agent and adjusted to pH 5 by acetic acid and sodium acetate (corresponding to dyeing conditions such that the dyeing ratio is 1:10 and a dyeing concentration of 4/1N), was boiled at 130° C. for 60 minutes. After cooling, it was separated into portions of 100 ml at 90° C., which were filtered under suction through a cotton blord #40 (70 mm in diameter) and Toyo filter paper No. 5-A (70 mm in diameter), whereupon the amounts of the colorants remaining on the filter materials were visually evaluated in accordance with the following standards:

Grade 3 (good): No colorant remained on the filter material

Grade 2 (slightly poor): Some colorant remained on the filter material

Grade 1 (Poor): Colorant remained on the filter material in a substantial amount.

TABLE 2

| Example Nos. | Dyes employed and their blend ratios | Carrier dyeing property (%) | Temp. dependency (%) | Light fastness (grade) | Sublimation fastness (grade) | High temp. dispersibility (grade) |
|---|---|---|---|---|---|---|
| Example 1 | (A) + (B) + (C − 1) = 54 + 35 + 11 | 95 | 95 | 6 | 3–4 | 3 |
| Example 2 | (A) + (B) + (C − 2) = 54 + 33 + 13 | 90 | 95 | 5–6 | 3–4 | 3 |
| Example 3 | (A) + (B) + (C − 3) = 51 + 33 + 16 | 90 | 95 | 5–6 | 3–4 | 3 |

TABLE 2-continued

| Example Nos. | Dyes employed and their blend ratios | Carrier dyeing property (%) | Temp. dependency (%) | Light fastness (grade) | Sublimation fastness (grade) | High temp. dispersibility (grade) |
|---|---|---|---|---|---|---|
| Example 4 | (A) + (B) + (C − 4) = 54 + 35 + 11 | 95 | 100 | 6 | 3-4 | 3 |
| Example 5 | (A) + (B) + (C − 2) + (C − 3) = 52 + 34 + 10 + 4 | 90 | 95 | 5-6 | 3-4 | 3 |
| Example 6 | (A) + (B) + (C − 2) + (C − 4) = 52 + 34 + 8 + 6 | 93 | 98 | 5-6 | 3-4 | 3 |
| Example 7 | (A) + (B) = 50 + 50 | 80 | 85 | 5-6 | 3-4 | 2 |
| Example 8 | (A) + (B) = 70 + 30 | 90 | 95 | 5-6 | 3-4⁻ | 3 |
| Example 9 | (A) + (B) = 40 + 60 | 85 | 90 | 5+ | 3-4+ | 3 |
| Comparative Example 1 | (A) alone | 40 | 50 | 6 | 3 | 1 |
| Comparative Example 2 | (B) alone | 30 | 40 | 4 | 5 | 1 |
| Comparative Example 3 | (C − 1) alone | 30 | 35 | 5-6 | 3-4 | 2 |
| Comparative Example 4 | (C − 2) alone | 15 | 25 | 5 | 5 | 2 |
| Comparative Example 5 | (C − 3) alone | 15 | 25 | 5 | 5 | 3 |
| Comparative Example 6 | (C − 4) alone | 40 | 50 | 6 | 3-4 | 2 |
| Comparative Example 7 | (A) + (C − 2) = 80 + 20 | 60 | 60 | 5-6 | 3 | 1 |
| Comparative Example 8 | (A) + (C − 3) = 80 + 20 | 60 | 60 | 5-6 | 3 | 1 |
| Comparative Example 9 | (B) + (C − 3) = 80 + 20 | 40 | 50 | 5 | 5 | 1 |
| Comparative Example 10 | (B) + (C − 4) = 80 + 20 | 65 | 65 | 5-6 | 4-5 | 1 |

EXAMPLES 10 TO 12

Tests were conducted in the same manner as in Example 2 except that the blend ratio of the dyes (A), (B) and (C-2) were changed as shown in Table 3, whereupon the results as shown in Table 3 were obtained.

TABLE 3

| Example Nos. | Dyes employed and their blend ratios | Carrier dyeing property (%) | Temp. dependency (%) | Light fastness (grade) | Sublimation fastness (grade) | High temp. dispersibility (grade) |
|---|---|---|---|---|---|---|
| Example 10 | (A) + (B) + (C − 2) = 75 + 15 + 10 | 90 | 95 | 5-6 | 3-4⁻ | 3 |
| Example 11 | (A) + (B) + (C − 2) = 30 + 60 + 10 | 85 | 90 | 5+ | 3-4+ | 3 |
| Example 12 | (A) + (B) + (C − 2) = 40 + 35 + 25 | 90 | 95 | 5-6 | 3-4 | 3 |

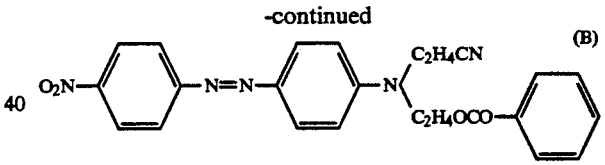

(B)

We claim:

1. A disperse dye mixture comprising from 20 to 80% by weight of an orange disperse dye of the following formula A) and from 20 to 80% by weight of an orange disperse dye of the following formula (B), as dye components:

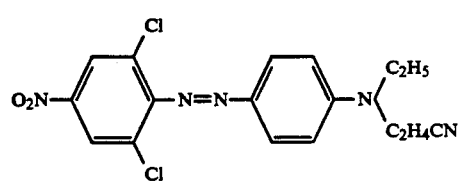

(A)

2. The disperse dye mixture according to claim 1, wherein the orange disperse dye of the formula (A) is from 30 to 70% by weight and the orange disperse dye of the formula (B) is from 30 to 70% by weight.

3. The disperse dye mixture according to claim 1, which further contains a yellow disperse dye of the following formula (C), and which comprises from 20 to 80% by weight of the orange disperse dye of the formula (A), from 20 to 80% by weight of the orange disperse dye of the formula (B) and more than 0 and up to 30% by weight of the yellow disperse dye of the formula (C), as dye components:

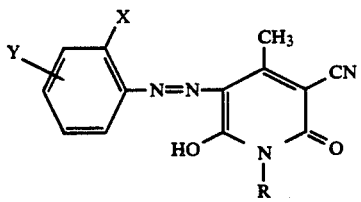

wherein X is a hydrogen atom or a nitro group, Y is a halogen atom, a phenoxyethoxycarbonyl group or a phenylsulfonyloxy group, and R is a $C_{1-8}$ linear or branched alkyl group.

4. The disperse dye mixture according to claim 3, wherein the blend ratio of the dye of the formula (B) to the dye of the formula (A) is from 0.2 to 2 times by weight, and the blend ratio of the dye of the formula (C) to the total amount of the dyes of the formulas (A) and (B) is not more than 0.5 time by weight.

5. The disperse dye mixture according to claim 3, wherein the blend ratio of the dye of the formula (B) to the dye of the formula (A) is from 0.3 to 1.5 times by weight, and the blend ratio of the dye of the formula (C) to the total amount of the dyes of the formulas (A) and (B) is from 0.1 to 0.4 time by weight.

6. The disperse dye mixture according to claim 3, wherein R in the formula (C) is a $C_{1-4}$ alkyl group.

7. The disperse dye mixture according to claim 3, wherein the dye of the formula (C) has the substituent Y at the 3- or 4-position to the amino group in the benzene ring.

8. The disperse dye mixture according to claim 3, wherein the dye of the formula (C) is at least one member selected from the group consisting of dyes of the following formulas (C-1), (C-2), (C-3) and (C-4):

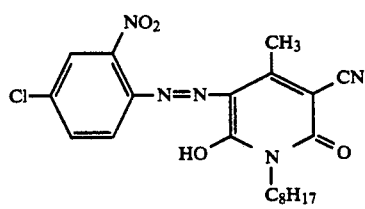

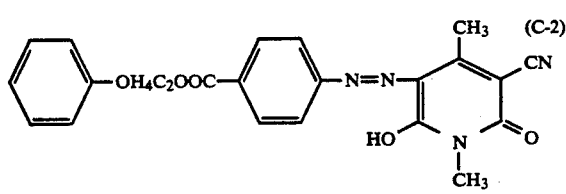

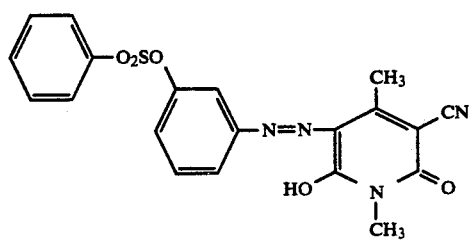

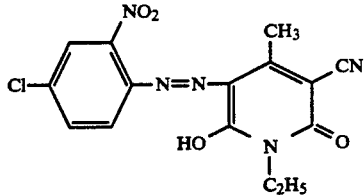

9. A method for dyeing polyester fibers with a dye mixture, comprising dyeing said polyester fibers with a disperse dye mixture comprises from 20 to 80% by weight of an orange disperse dye of the following formula (A) and from 20 to 80% by weight of an orange disperse dye of the following formula (B), as dye components:

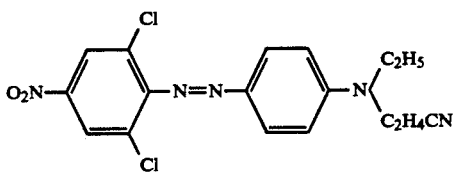

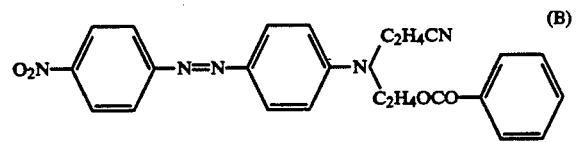

10. A method for dyeing polyester fibers with a dye mixture, comprising dyeing said polyester fibers with a disperse dye mixture comprises from 20 to 80% by weight of a orange disperse dye of the following formula (A), from 20 to 80% by weight of an orange disperse dye of the following formula (B) and more than 0 and up to 30% by weight of a yellow disperse dye of the following formula (C), as dye components:

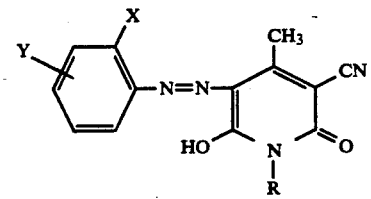

wherein X is a hydrogen atom or a nitro group, Y is a halogen atom, a phenoxyethoxycarbonyl group or a phenylsulfonyloxy group, and R is a $C_{1-8}$ linear or branched alkyl group.

* * * * *